United States Patent
Wakita et al.

(10) Patent No.: US 6,278,574 B1
(45) Date of Patent: Aug. 21, 2001

(54) DATA STORAGE DEVICE HAVING A SINGLE-PIECE INTEGRAL FRAME

(76) Inventors: Maki Wakita, 2-202, 7-15, Gion, Sayama-Shi, Saitama; Katsutoshi Mukaijima, 107-301, 5-31-18, Maesawa, Higashi, Kurume-Shi, Tokyo; Shoji Takahashi, 494-23, Nakayama, Hanno-Shi, Saitama, all of (JP)

( * ) Notice: Subject to any disclaimer, the term of this patent is extended or adjusted under 35 U.S.C. 154(b) by 0 days.

(21) Appl. No.: 09/272,863

(22) Filed: Mar. 19, 1999

(30) Foreign Application Priority Data

Mar. 20, 1998 (JP) .................................................. 10-071589

(51) Int. Cl.$^7$ .................................................. G11B 5/012
(52) U.S. Cl. ...................................... 360/99.01; 360/97.01
(58) Field of Search ......................... 369/77.2; 360/97.01, 360/99.01, 99.04, 99.02

(56) References Cited

U.S. PATENT DOCUMENTS

| | | | |
|---|---|---|---|
| 4,930,029 | * 5/1990 | Morita ............................... | 360/97.01 |
| 5,025,336 | * 6/1991 | Morehouse et al. .............. | 360/97.02 |
| 5,109,310 | * 4/1992 | Ohkjita et al. ..................... | 360/106 |
| 5,243,495 | * 9/1993 | Read et al. ........................ | 361/685 |
| 5,270,887 | * 12/1993 | Edwards et al. .................. | 360/97.03 |
| 5,329,412 | * 7/1994 | Stefansky ........................... | 360/97.01 |
| 5,457,588 | * 10/1995 | Hattori et al. .................... | 360/99.08 |
| 5,461,523 | * 10/1995 | Hoshi ................................. | 360/99.12 |
| 5,532,889 | * 7/1996 | Stefansky et al. ................ | 360/97.01 |
| 5,596,461 | * 1/1997 | Stefansky ........................... | 360/97.01 |
| 5,602,697 | * 2/1997 | Jeong et al. ....................... | 360/97.02 |
| 5,689,388 | * 11/1997 | Oka et al. .......................... | 360/99.12 |
| 5,864,441 | * 1/1999 | Coffey et al. ..................... | 360/97.01 |
| 5,870,248 | * 2/1999 | Akutsu et al. ..................... | 360/99.04 |
| 5,982,578 | * 11/1999 | Forbord et al. ................... | 360/97.01 |
| 6,011,670 | * 1/2000 | Balsey, Jr. et al. ............... | 360/97.01 |
| 6,031,686 | * 2/2000 | Konno et al. ..................... | 360/99.01 |
| 6,034,840 | * 3/2000 | Yamamoto et al. .............. | 360/97.01 |
| 6,034,841 | * 3/2000 | Albrecht et al. .................. | 360/97.01 |
| 6,094,324 | * 7/2000 | Komatsu et al. ................. | 360/99.01 |

* cited by examiner

Primary Examiner—Brian E. Miller
(74) Attorney, Agent, or Firm—Woodcock Washburn Kurtz Mackiewicz & Norris LLP

(57) ABSTRACT

A data storage device has a disk-drive motor, a head-drive motor, read/write heads, and an integrated circuit board, all mounted on a single-piece integral frame and enclosed by a casing. Each motor is mounted within a surface recess on the frame via an attachment lip integrally formed into each recess. Additionally, a bend is formed across the width of the frame. The single-piece frame, frame bend, and surface recesses provide the data storage device with significant structural rigidity and thus enhance the ability of the device to withstand the application of externally-applied forces.

36 Claims, 6 Drawing Sheets

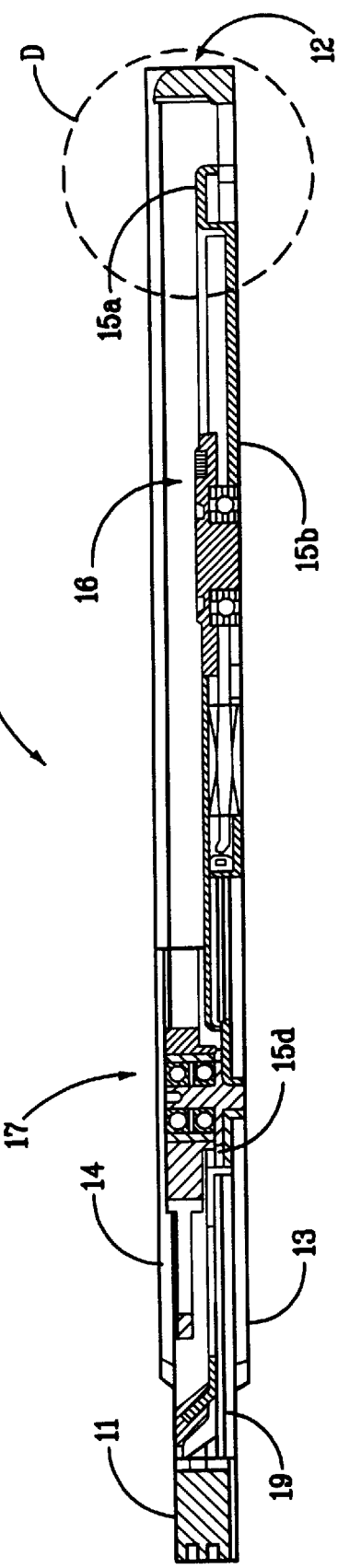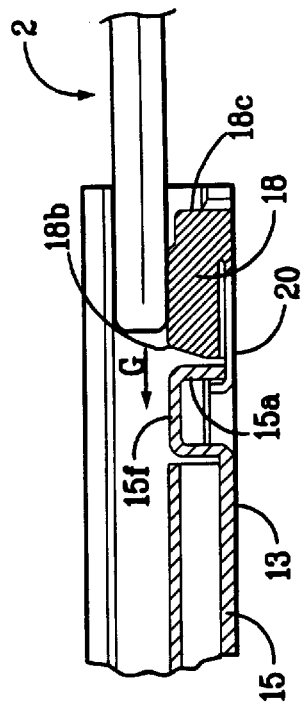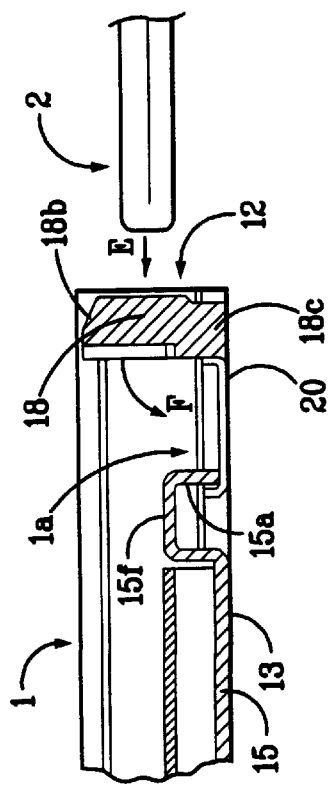

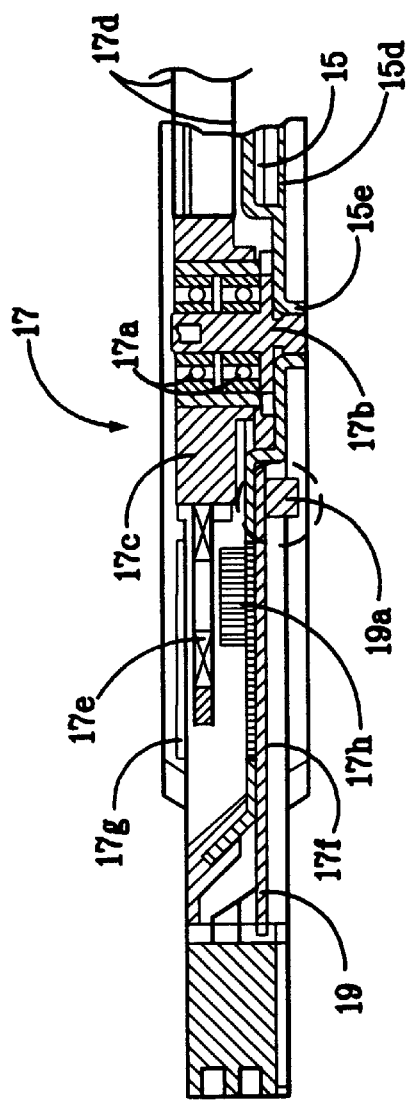

DATA STORAGE DEVICE HAVING A SINGLE-PIECE INTEGRAL FRAME

BACKGROUND OF THE INVENTION

Portable electronic devices for the storage and retrieval of information, such as notebook computers, have become smaller and more lightweight in recent years. As a result of this trend, the use of memory cards has become popular. Memory cards are used as a storage medium for data, and can readily be inserted into and removed from most portable information storage and retrieval devices.

Most memory cards employ semiconductors for the storage of data. These types of cards, however, are relatively expensive and possess relatively low data-storage capacity. These limitations have lead to the development of data storage devices which utilize a magnetic storage medium placed inside a memory-card-type cartridge.

To increase the portability of information storage and retrieval devices, magnetic data storage devices are being produced in increasingly smaller sizes. In particular, thinner designs are continually being sought due to the direct relationship between thickness and portability. Such reductions in size, however, reduce the structural stiffness of the storage device. This reduction in stiffness makes deformation of the device more likely upon the application of external forces, thereby increasing the chances for damage to the device itself or to the information stored in the device. Thus, a need exists for a small, thin magnetic storage device with sufficient structural stiffness to resist externally-applied forces without undergoing significant deformation.

SUMMARY OF THE INVENTION

The present invention is directed to a data storage device comprising an outer casing, a disk-drive motor, a head-drive motor, read/write heads for storing and retrieving data from a magnetic disk medium, and an integrated circuit board for controlling the operation of the device. The motors, heads, and integrated circuit are affixed to a single-piece frame mounted within the casing. The casing is equipped with an opening which facilitates access to the internal components by a data storage cartridge containing the aforementioned magnetic disk medium.

The frame is equipped with two cylindrically-shaped recesses in its surface. The disk-drive and head-drive motors are each mounted in one of these recesses via an attachment lip integrally formed in each recess. Additionally, a bend is formed in the frame near the cartridge-access opening in the casing. The top surface of this bend acts as a guide for the data storage cartridge during its insertion into the data storage device.

BRIEF DESCRIPTION OF THE DRAWINGS

The foregoing summary, as well as the following detailed description of the preferred embodiments, are better understood when read in conjunction with the appended drawings. For the purpose of illustrating the invention, the drawings show an embodiment that is presently preferred, it being understood, however, that the invention is not limited to the specific methods and instrumentalities disclosed. In the drawings:

FIG. 3 is cross-sectional view of the storage device of FIG. 1 along the line C—C of FIG. 2;

FIG. 4 is a partial enlargement of the cross-section of FIG. 3 showing the area marked as section D;

FIG. 5 shows the area illustrated in FIG. 4 with a data storage cartridge partially inserted;

FIG. 10 is a partial enlargement of the cross-section of FIG. 3 showing the head-drive motor of the storage device; and FIG. 11 is a partial enlargement of the cross-section of FIG. 10 showing the integrated circuit of the storage device.

DETAILED DESCRIPTION OF PREFERRED EMBODIMENT

The present invention provides a data storage device for use with portable electronic devices. Throughout the description, a preferred embodiment of the invention is described in connection with a data storage device having a particular size and shape. However, the dimensions and shape are presented for exemplary purposes only. Accordingly, the invention should not be limited to the particular embodiment shown, as the invention contemplates application to other types and configurations of data storage devices.

Figure 1:
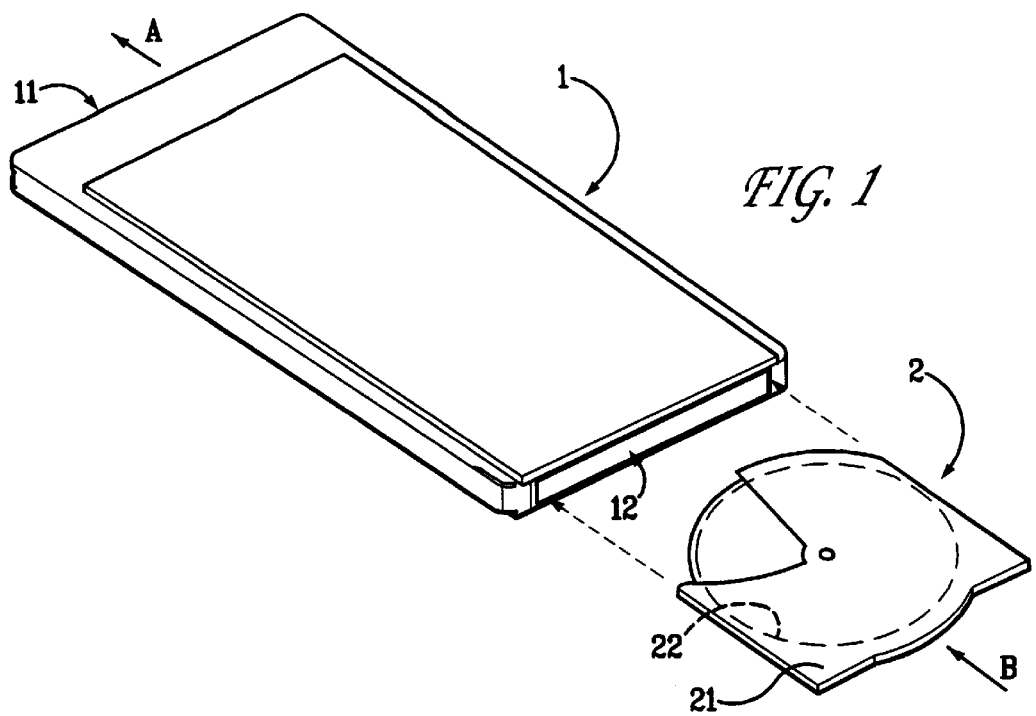
FIG. 1 is an isometric view of a data storage device according to the present invention, and a data storage cartridge for use in the device.

FIG. 1 is an overall illustration of a data storage device 1 and a removable data storage cartridge 2 suitable for use in the storage device. Device 1 is equipped with an opening 12 through which data storage cartridge 2 can be inserted and removed.

Data storage cartridge 2 comprises a disk-shaped storage medium 22 enclosed by a casing 21, whereby the medium rotates freely within the casing.

Data storage device 1 can be inserted into the main body of a computer device by inserting the storage device into an appropriately-sized slot, in the direction indicated by arrow A in FIG. 1. Device 1 is equipped with a connector 11 which allows the device to electronically interface with the computer.

Figure 2:
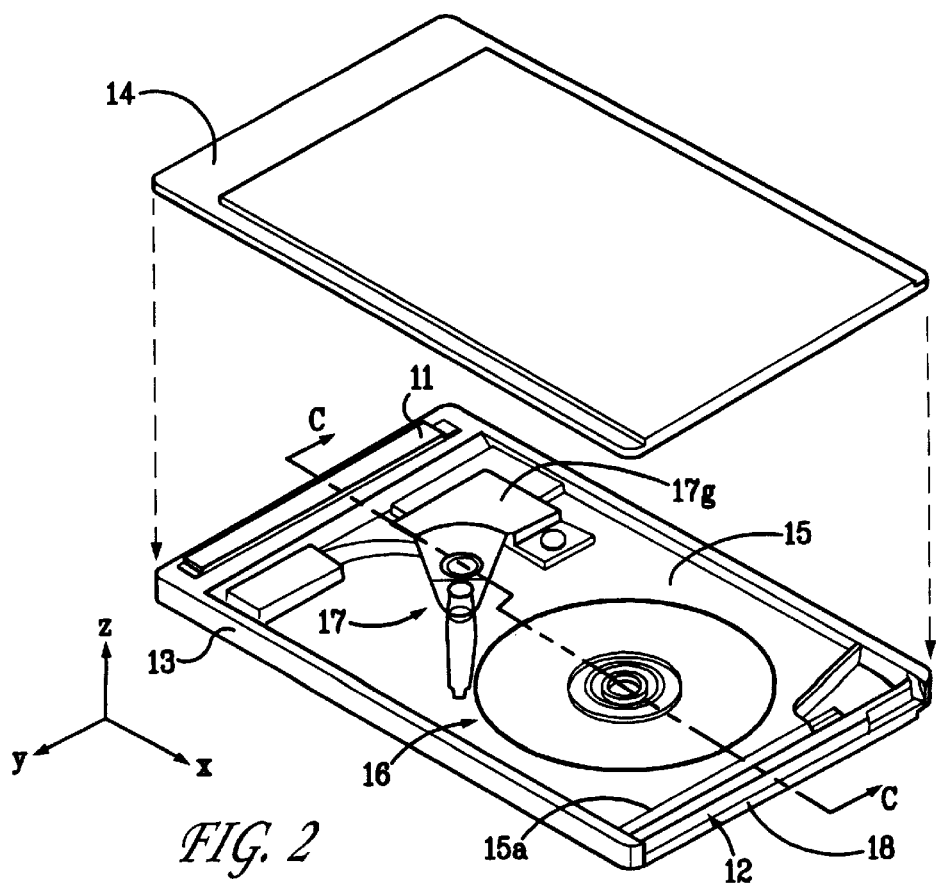
FIG. 2 is an isometric view of the storage device of FIG. 1 with the upper cover removed.

FIGS. 2 and 3 illustrate the general concept of data storage device 1. Storage device 1 is covered by a casing. Preferably, the casing has the shape and dimensions conforming to the PCMCIA type-II form factor, i.e., about 86 mm long, 54 mm wide, and 5 mm thick. The casing comprises an upper casing 14 and a lower casing 13.

A frame 15 is located within the casing about mid-way between upper casing 14 and lower casing 13. A disk drive motor 16 and a read/write head assembly 17 are mounted to the upper surface of frame 15. A circuit board 19 is attached to the lower surface of frame 15 through an insulating sheet 3 (shown in FIG. 9). A movable door 18 is coupled to opening 12 to isolate the interior of data storage device 1 when data storage cartridge 2 is not installed, and to increase the structural stiffness of the device.

As indicated above, frame 15 provides a means for mounting the primary components of data storage device 1. Mounting the primary components on a single frame simplifies the structure of the device and reduces the overall part count. Additionally, as explained below, the geometry of frame 15 minimizes the overall dimensions of data storage device 1. Furthermore, since frame 15 spans substantially the entire length and width of device 1, the frame provides resistance to externally-applied bending forces which, absent the structural stiffness afforded by the frame, could damage data storage device 1.

FIG. 4 illustrates the details of cartridge access opening 12. The bottom end of door 18 is coupled to lower casing 13 in a manner that allows the door to rotate inward, as indicated by arrow F in the figure. A spring (not shown) forces door 18 into the closed, i.e., vertical, position when data storage cartridge 2 is not installed in the data storage device. Because door 18 spans substantially the entire width of data storage device 1, the door resists bending moments about the longitudinal (x) axis of the device. Thus, door 18 augments and enhances the structural rigidity of device 1.

Frame 15 contains a bend 15a adjacent to disk access opening 12. As indicated in detail in FIG. 4, a portion of bend 15a forms the shape of an inverted "U." Bend 15a provides the frame with substantial resistance to bending about the longitudinal axis. Additionally, the top surface of bend 15a forms a horizontal section 15f which guides data storage cartridge 2 into position as it is inserted into data storage device 1.

A door-receiving section 1a is formed by the gap between frame bend 15a and cartridge access opening 12. Insertion of disk cartridge 2 forcibly rotates door 18 in the direction F illustrated in FIG. 4, against the bias of a spring (not shown). When door 18 reaches about 90 degrees of travel from the vertical position, the door is partially enclosed within section 1a. As evident from FIG. 5, while in this position the top surface of door 18 forms a surface which is about level with cartridge guide section 15f. Thus, storing door 18 in the noted manner is conducive to the smooth installation of cartridge 2 into device 1.

Frame 15 is formed from a non-magnetic material, e.g., non-magnetic stainless steel. The thickness of frame 15 preferably spans a range of about 0.2 to 0.7 mm.

Figure 6:
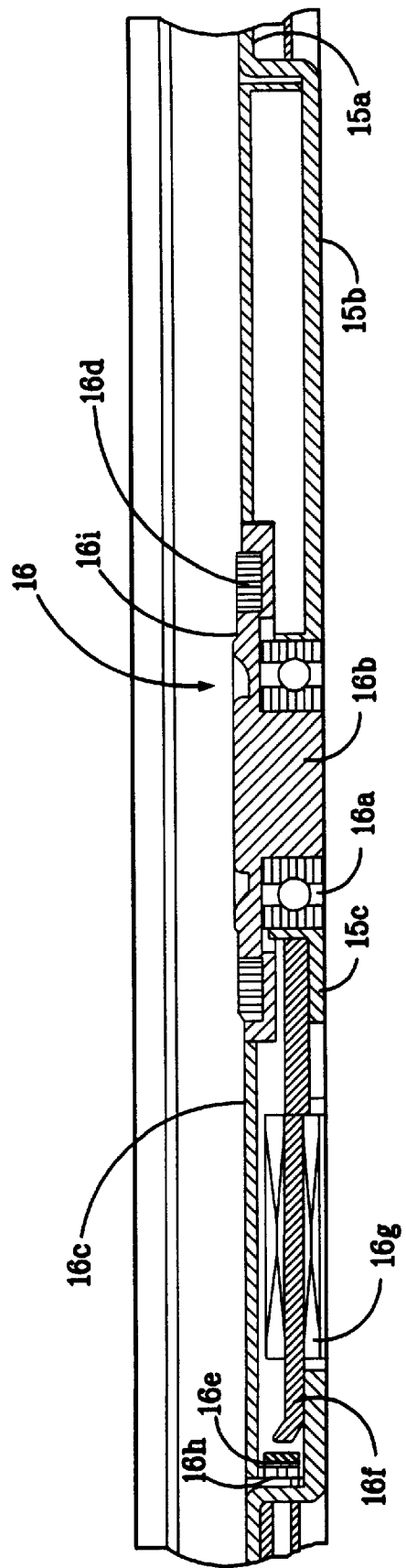
FIG. 6 is a partial enlargement of the cross-section of FIG. 3 showing the disk-drive motor of the storage device.
Figure 7:
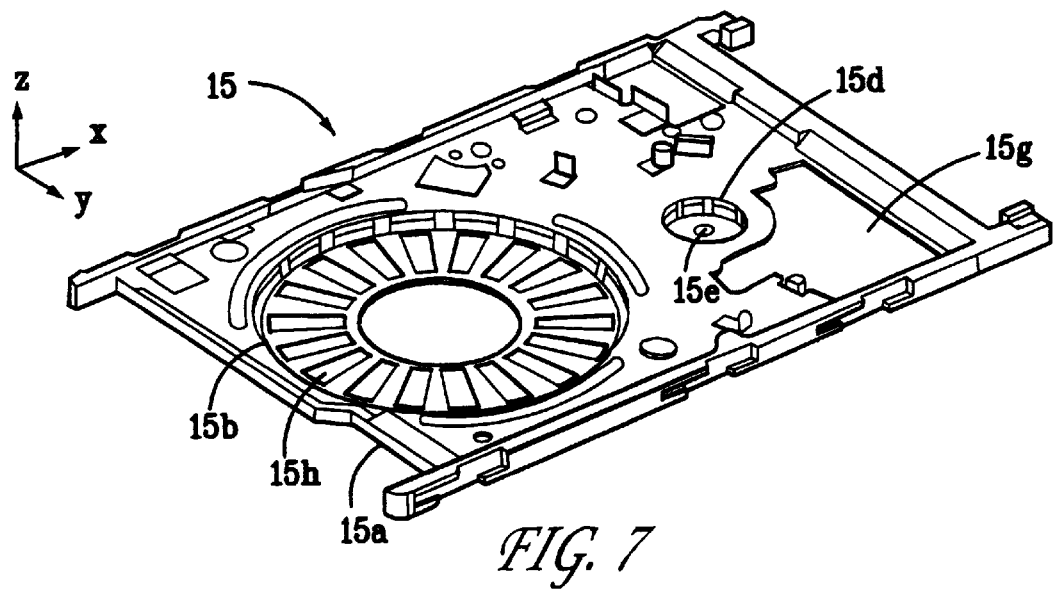
FIG. 7 is an isometric view showing the top of the frame of the data storage device of FIG. 1.
Figure 8:
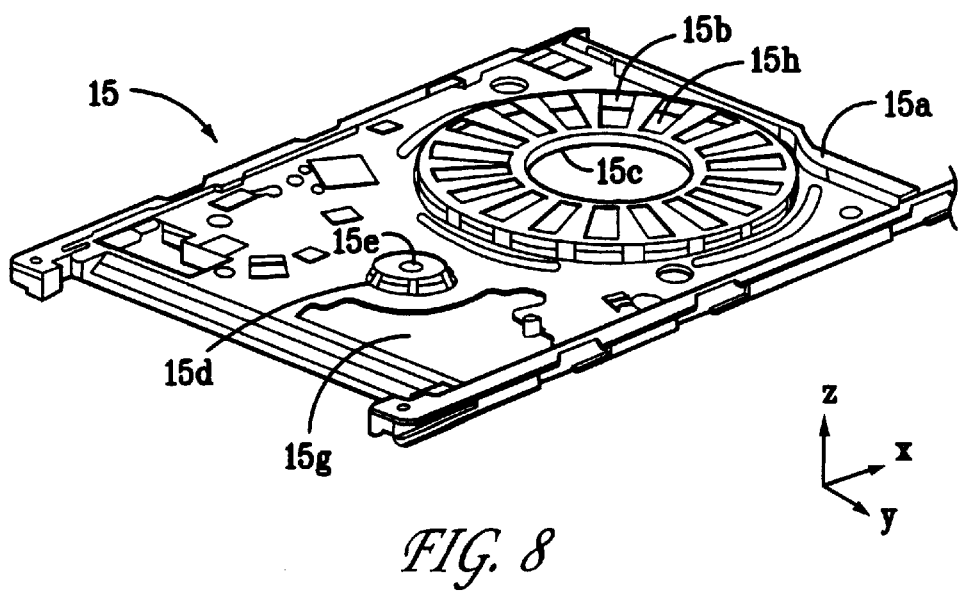
FIG. 8 is an isometric view showing the top of the bottom of the data storage device of FIG. 1.

Frame 15 contains a shallow recess 15b, as illustrated in detail in FIGS. 6 through 8. Recess 15b is circular in shape, and is approximately centered on the longitudinal axis of data storage device 1. Recess 15b is preferably stamped into frame 15. Preferably, the diameter and depth of recess 15b are about 37 mm and 1.6 mm, respectively.

A disk-drive-motor attachment lip 15c is located in the center of frame recess 15b. As evident from FIG. 6, lip 15c extends upwardly from the surface of recess 15b, forming a cylindrical attachment point for motor 16. This mounting scheme allows the top of drive motor 16 to remain roughly level with the main surface of frame 15, while providing sufficient space below the main surface to accommodate the various component parts of the motor.

A bearing 16a of motor 16 is positioned within attachment lip 15c. A rotor shaft 16b is located within bearing 16a. A horizontally-oriented cartridge support section 16i is formed in rotor shaft 16b. Section 16i supports data storage cartridge 2 when the cartridge is installed in data storage device 1. Section 16i also functions as an attachment point for a rotor 16c and a disk-hub coupling magnet 16d.

Rotor 16c is formed in the shape of a shallow cylindrical cup, and is placed on support section 16i in inverted position. A plurality of rotor magnets 16e are placed along the inner circumference of rotor wall 16h. Disk-adhesion magnet 16d is mounted on the top surface of rotor-shaft support section 16i such that the top surface of magnet 16d extends slightly higher than the surface of rotor 16.

Figure 9:
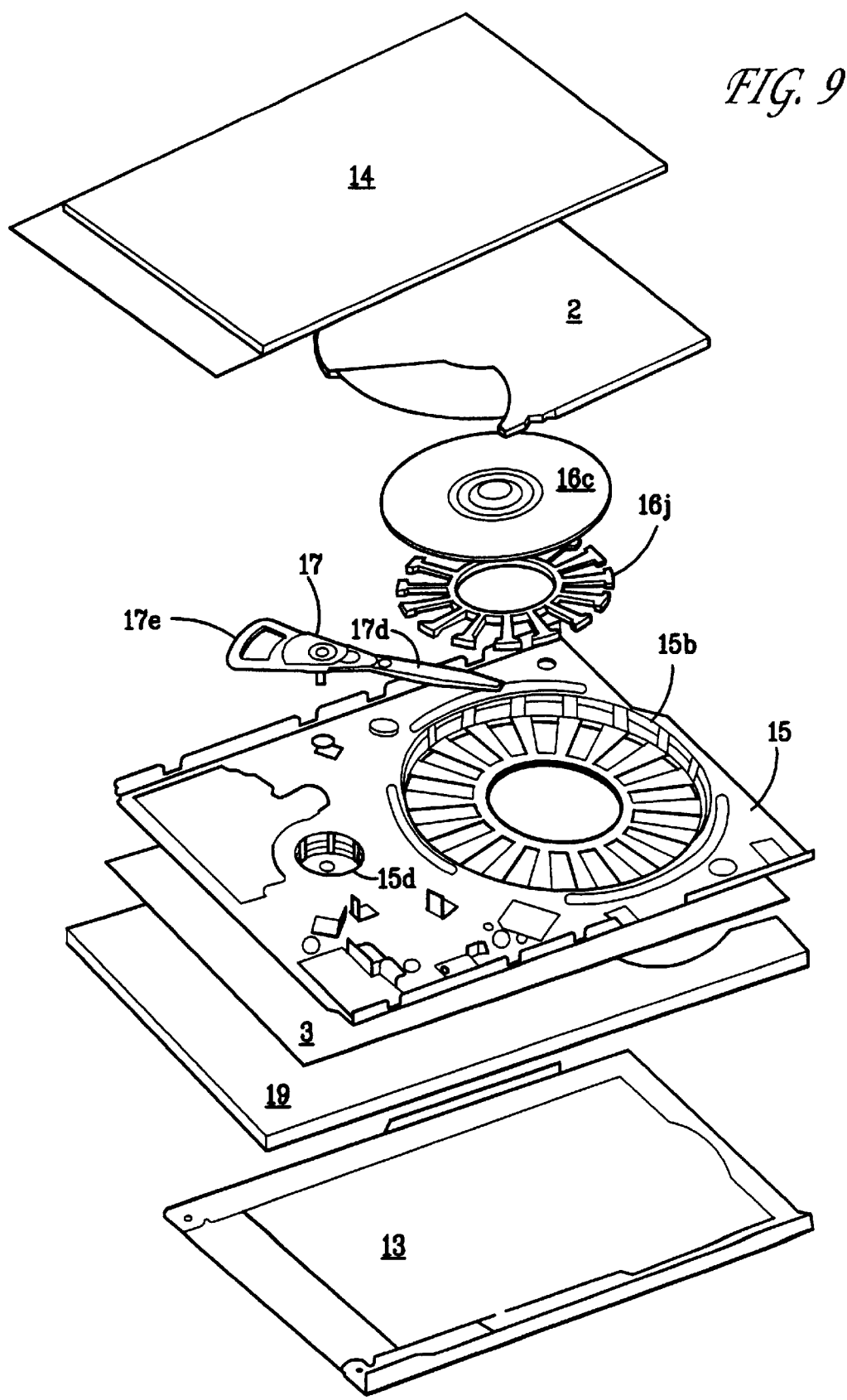
FIG. 9 is an exploded view of the device of FIG. 1.

An assembly 16j contains a plurality of yoke members 16f arranged in a radial pattern about a center ring, as illustrated in FIG. 9. Yoke-member assembly 16j is made of a material which is capable of magnetization. The inner ring of assembly 16j is affixed to the exterior of attachment lip 15c, resulting in a circular arrangement of yoke members 16f about the center of frame recess 15b. As evident in FIG. 6, each yoke member 16f spans substantially the entire radius of recess 15b, thus placing the end of each member in a location proximate to disk drive magnets 16e.

A stator coil 16g is attached to each yoke member 16f. Coils 16g are electrically connected to an electronic control circuit (not shown). The bottom section of each coil is accommodated by an opening 15h in frame recess 15b, as illustrated in FIGS. 6 through 8. The flow of electrical current through coils 16g produces a rotational force on rotor 16c. Thus, by selectively sending current through coils 16g, the control circuit can vary the rotational position of a data storage disk 22 placed on rotor 16c.

FIGS. 7 through 10 illustrate another shallow recess 15d formed in frame 15. Like recess 15b, recess 15d is circular in shape and is preferably stamped into frame 15. Recess 15d accommodates the supporting structure for read/write head assembly 17. Preferably, the diameter and depth of recess 15d are about 7 and 1.6 mm, respectively. The center-to-center distance between recesses 15b and 15d is preferably about 32 mm along the longitudinal axis, and about 3 mm along the lateral (y) axis of frame 15.

A downward-extending cylindrical attachment lip 15e is formed in the center of recess 15d. Lip 15e functions as an attachment point for head assembly 17. A shaft 17b is positioned within attachment lip 15e. Two bearings 17a are placed on shaft 17b. A base 17c for head assembly 17 is placed over bearings 17a.

An arm 17d and a stator coil 17e are fixed to base 17c. Coil 17e is electrically connected to a control circuit (not shown). Arm 17d is formed from a long, extended steel plate. Read/write head 17i is attached to the opposite end of arm 17d.

An arc-shaped lower head-yoke 17f is fixed within an opening 15g in frame 15. As evident in FIGS. 7 and 8, opening 15g is located directly adjacent to frame recess 15d. Integrating yoke 17f into frame 15 in this manner, as opposed to attaching the yoke to the top surface of the frame, reduces the height, i.e., the thickness, of data storage device 1.

A head-drive magnet 17h is fixed to the top surface of yoke 17f. Magnet 17h faces the lower surface of a stator coil 17e. An upper yoke 17g is attached to frame 15 such that the bottom surface of yoke 17g faces the upper surface of coil 17e, as shown in FIG. 2. Yokes 17f and 17g are made of magnetic materials, or materials which are capable of magnetization. Thus, the application of current through coil 17e results in a force which moves the coil through a circular arc. Since coil 17e is connected to read/write head 17i through base 17c and arm 17d, movement of the coil produces a corresponding movement of head 17i. Hence, by selectively sending current through coil 17e, the position of read/write head 17i can be varied in relation to data storage disk 22.

Circuit board 19 is mounted to the underside of frame 15, as illustrated in FIG. 10. As noted previously, insulating sheet 3 is interspersed between frame 15 and circuit board 19. Due to the presence of frame recesses 15b and 15d, a clearance of about 1.35 mm exists between the bottom surface of frame 15 and lower casing 13. A 1.20-mm thick integrated circuit 19a can thus be accommodated without any increase in the thickness of data storage device 1, as illustrated in FIG. 11. Hence, the need and expense of developing a specially-developed integrated circuit are obviated.

As evident from the above discussion, the invention embodies a substantially continuous frame 15 for mounting the primary components of data storage device 1. The use of a single frame 15 increases the rigidity of data storage device 1 relative to devices which use multi-piece frames or no frames at all. Additionally, recesses 15b and 15d, by virtue of their geometry and integration into frame 15, provide further resistance to bending about the lateral and longitudinal axes of device 1. Frame 15 thus enhances the durability of relatively small and thin data storage devices by providing such devices with the ability to resist eternally-applied forces without significant deformation or damage.

As noted previously, recesses 15b and 15d provide a means for mounting the primary components of data storage device 1 in a manner which minimizes the thickness of the device, thereby allowing the device to fit within a form factor conforming to the PCMCIA type-II standard. Hence, frame 15 makes a small, portable data storage device feasible from the standpoint of minimizing the size of the device without decreasing the device's durability. Additionally, the placement of frame bend 15a between disk drive motor 16 and cartridge access opening 12 allows the bend to be used a guide for data storage cartridge 2, thereby facilitating smooth insertion of the cartridge. Finally, manufacturing frame 15 by a stamping process allows drive motor 16 and read/write head 17i to be positioned with great accuracy, thereby enhancing the reliability of data storage device 1.

The above description of the preferred embodiment is not intended to implied limit the scope of protection of the following claims. Therefore, the following claims are not limited to applications involving, for example, PCMCIA-type data storage devices for computers.

What is claimed is:

1. A data storage device for use with a data storage cartridge having a storage medium therein comprising:
   a frame having a first surface recess which provides structural rigidity to said frame,
   a disk-drive motor which causes said storage medium to rotate, at least a portion of said disk-drive motor being mounted to said frame within said first surface recess,
   a read/write head which stores and reads information to and from said storage medium; and
   a head-dive motor which moves said read/write head to and from a location proximate said storage medium, said head-drive motor being mounted to said frame, and said read/write head being coupled to said head-drive motor, wherein said frame comprises a bend located between said disk drive motor and a proximal longitudinal end of said frame, said bend assisting in guiding said data storage cartridge into an operating position within said data storage device when said data storage medium is inserted therein, at least a portion of said bend extending substantially parallel to said proximal longitudinal end of said frame and having a substantially U-shaped cross-section.

2. The data storage device of claim 1, wherein said frame has a second surface recess, at least a portion of said head-drive motor being mounted within said second surface recess.

3. The data storage device of claim 2, wherein said first and second surface recesses are circular in shape.

4. The data storage device of claim 3, wherein said first and second surface recess are formed by stamping.

5. The data storage device of claim 2, wherein said first surface recess comprises a first lip to which said disk-drive motor is attached.

6. The data storage device of claim 5, wherein said first lip extends upwardly from a bottom of said first surface recess.

7. The data storage device of claim 6, wherein said first lip is cylindrical in shape.

8. The data storage device of claim 5, wherein said first lip is centered in said fist surface recess.

9. The data storage device of claim 5, wherein said first lip is formed by stamping.

10. The data storage device of claim 2, wherein said second surface recess comprises a second lip to which said head-drive motor is attached.

11. The data storage device of claim 10, wherein said second lip extends downwardly from a bottom of said second surface recess.

12. The data storage device of claim 11, wherein said second lip is cylindrical in shape.

13. The data storage device of claim 10, wherein said second lip is centered in said second surface recess.

14. The data storage device of claim 10, wherein said second lip is formed by drawing.

15. The data storage device of claim 2, further comprising an electronic circuit board.

16. The data storage device of claim 15, wherein said circuit board is mounted to a bottom surface of said frame.

17. The data storage device of claim 16, wherein said circuit board comprises openings conforming substantially to the dimensions of said first and second surface recesses.

18. The data storage device of claim 10, wherein said head-drive motor comprises a drive magnet fixed to an upper surface of a lower yoke, an upper yoke located proximate the upper surface of said drive magnet, and a head-moving coil located between said drive magnet and said upper yoke, said frame manufactured from a non-magnetic material and said upper and lower yokes manufactured from a magnetic material or a material that is capable of magnetization.

19. The data storage device of claim 18, wherein said head-moving coil is coupled to said read/write head through an arm such that movement of said coil produces a corresponding movement of said read/write head.

20. The data storage device of claim 19, wherein said arm is rotatably coupled to a shaft, and said shaft is coupled to said second lip.

21. The data storage device of claim 20, wherein said shaft is coupled to an inner circumference of said second lip.

22. The data storage device of claim 18, wherein said lower yoke is integrally mounted in an opening in said frame.

23. The data storage device of claim 5, wherein said disk-drive motor comprises a plurality of yoke members and a plurality of coils mounted on said yoke members, said frame manufactured from a non-magnetizing material and said yoke members manufactured from a magnetizing material.

24. The data storage device of claim 23, wherein said yoke members are coupled to said first lip.

25. The data storage device of claim 23, wherein lower halves of said coils are located within a plurality of openings in said frame.

26. The data storage device of claim 23, wherein said disk-drive motor further comprises a rotor formed in the shape of an shallow cylinder, said rotor being-rotatably mounted on said first lip.

27. The data storage device of claim 26, wherein said disk-drive motor further comprises a plurality of magnets disposed along an inner circumference of a side wall of said rotor.

28. The data storage device of claim 26, wherein said rotor is rotatably mounted on an inner circumference of said first lip, and said yoke members are coupled to an outer circumference of said first lip.

29. The data storage device of claim 1, further comprising an outer casing enclosing said frame, said casing having an opening through which said data storage cartridge.

30. The data storage device of claim 29, wherein said casing conforms to the dimensions of a PCMCIA Type-II form factor.

31. The data storage device of claim 29, wherein a top surface of said frame is mounted substantially along a vertical centerline of said outer casing.

32. The data storage device of claim 1, wherein said frame is manufactured from a non-magnetic material.

33. The data storage device of claim 1, wherein said frame is manufactured from non-magnetic stainless steel.

34. The data storage device of claim 1, wherein said device has a thickness of less than about 5 mm.

35. The data storage device of claim 34, wherein said device has a width of less than about 54 mm.

36. The data storage device of claim 1, wherein a top surface of said bend forms a substantially planar section.

* * * * *